United States Patent [19]

Ohtaka et al.

[11] Patent Number: 4,768,493
[45] Date of Patent: Sep. 6, 1988

[54] BLOW-BY GAS HEATING SYSTEM FOR INTERNAL COMBUSTION ENGINES

[75] Inventors: Shoichi Ohtaka; Yukio Kondo, both of Saitama; Kaoru Aoki; Masayuki Kumada, both of Tokyo; Takashi Iwashita, Saitama, all of Japan

[73] Assignee: Honda Giken Kogyo Kabushiki Kaisha, Tokyo, Japan

[21] Appl. No.: 728,516

[22] Filed: Apr. 29, 1985

[30] Foreign Application Priority Data

Apr. 27, 1984 [JP] Japan .............................. 59-61515[U]
Apr. 27, 1984 [JP] Japan .............................. 59-61516[U]

[51] Int. Cl.$^4$ ........................................... F02M 25/06
[52] U.S. Cl. .................................... 123/573; 123/545; 123/574
[58] Field of Search ............... 123/572, 573, 574, 575, 123/545, 547

[56] References Cited

U.S. PATENT DOCUMENTS

| 1,543,732 | 6/1925 | Staley | 123/572 |
|---|---|---|---|
| 2,166,720 | 7/1939 | Gorleski | 123/572 |
| 3,088,447 | 5/1963 | Henderson | 123/573 |
| 3,153,083 | 3/1964 | Scribner | 123/573 |
| 3,273,550 | 9/1966 | Ball | 123/545 X |
| 3,358,661 | 12/1967 | Garner | 123/573 |
| 3,362,386 | 1/1968 | McMahon | 123/573 |
| 3,589,347 | 6/1971 | Sawada | 123/574 |
| 3,762,385 | 10/1973 | Hollnagel | 123/574 X |
| 3,832,985 | 9/1974 | Edde | 123/545 X |
| 4,205,642 | 6/1980 | Nishimura et al. | 123/574 |
| 4,374,512 | 2/1983 | Starum | 123/575 |
| 4,493,295 | 1/1985 | Ampferer | 123/572 X |
| 4,517,951 | 5/1985 | Otaka | 123/573 |
| 4,548,183 | 10/1985 | Hayashi | 123/545 X |

FOREIGN PATENT DOCUMENTS

| 620572 | 4/1927 | France | 123/573 |
|---|---|---|---|
| 115638 | 7/1926 | Switzerland | 123/573 |
| 2046839 | 11/1980 | United Kingdom | 123/572 |

Primary Examiner—Willis R. Wolfe, Jr.
Attorney, Agent, or Firm—Lyon & Lyon

[57] ABSTRACT

An arrangement for heating the blow-by gas system of a water cooled type internal combustion engine by providing engine coolant conduits in heat exchange relationship with the blow-by gas hoses and PCV valve. In one embodiment a water jacket surrounds the PCV valve. The heat exchangers between the blow-by gas system hoses and the coolant hoses are parallel adjacent conduits in one embodiment and concentric conduits in another embodiment.

6 Claims, 3 Drawing Sheets

BLOW-BY GAS HEATING SYSTEM FOR INTERNAL COMBUSTION ENGINES

This invention relates to a system for improving the operation of a conventional blow-by gas system of an internal combustion engine and, in particular, is directed to an arrangement for heating the blow-by gas with the water cooling system of the internal combustion engine.

An internal combustion engine develops gaseous mixtures in the crankcase which are comprised primarily of air and fuel, both burned and unburned, that by-passes the pistons and rings in small quantities from the combustion chamber and therefore is commonly known as "blow-by gas" although it may also include mist and vapors from the engine lubricating oil in the crankcase. It has become relatively conventional for pollution control and other reasons to conduct the blow-by gas from the crankcase into the engine air intake system to burn any combustible vapors and dispose of the blow-by gas. The pipe or hose connecting the crankcase to the engine intake for conducting the blow-by gas is conventionally provided with a check valve for preventing reverse flow which valve is commonly known as a Positive Crankcase Ventilation ("PCV") valve.

Various problems and deficiencies arise in blow-by gas systems including freezing of water vapors and incomplete vaporization of the hydrocarbons, either fuel or lubricating oil before introduction into the engine intake air system. There have been a number of proposals in the prior art for solving one or more of these problems in blow-by systems by providing heating arrangements. In U.S. Pat. No. 4,279,236 a portion of the blow-by gas which is said to contain the heavier particulate matter is passed in heat exchange relation with the exhaust manifold to assertively vaporize that particulate matter. In U.S. Pat. No. 4,068,628 all of the blow-by gas is passed through a heat exchanger on the exhaust pipe. In Japanese Utility Model Laid-Open No. 86417/1983 an electric heater is used for heating the blow-by system and in Japanese Utility Model Laid-Open No. 99045/1981 an electric heater is used for heating the PCV valve to prevent freezing, but electric heater systems incur electric power consumption and require controls to avoid excessive heating. In still another type of heating system disclosed in Japanese Utility Model Publication No. 26498/1980 warm air from the area of the exhaust manifold system that is also used for the intake air is used for heating the blow-by gas system but, of course, such a system is not applicable to engines that do not use preheated intake air.

Thus, it is an object of this invention to provide a novel form of blow-by gas system heating through the use of the coolant from the water-cooling system of the engine. A more specific object of this invention is to provide such a system for heating the PCV valve of the blow-by gas system with engine coolant.

The invention will be described in connection with several alternative embodiments illustrated in the drawings and it will readily appear to those skilled in the art that portions of one embodiment may be incorporated in another embodiment for particular applications or specific purposes, and therefore the invention should not be considered limited to the details of the drawings wherein.

Figure 1:
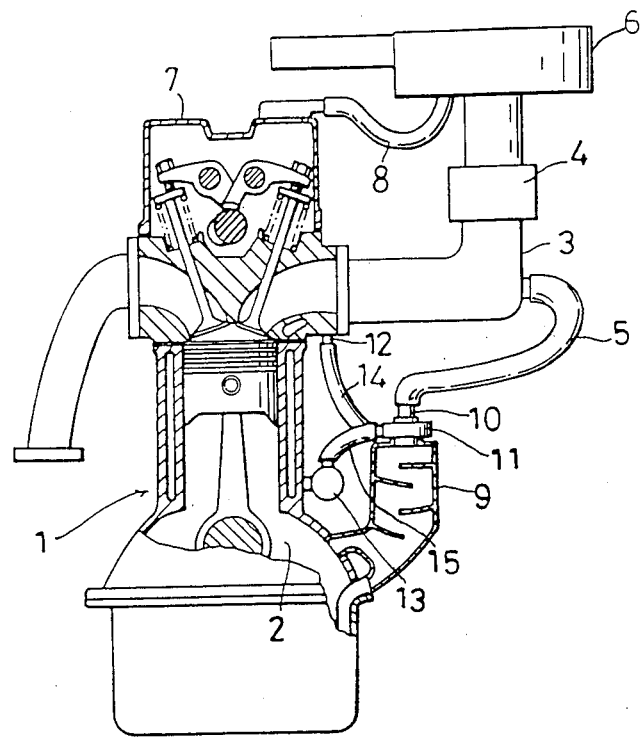
FIG. 1 is an end elevation with portions shown in section of an internal combustion engine incorporating one embodiment of this invention.

Referring now more particularly to the embodiment of FIG. 1, although it should be noted that the engine components are identical in the embodiments of FIGS. 1, 5, 6 and 7 and are so numbered, an internal combustion engine 1 of the water-cooled type is illustrated with a crankcase 2 in which the blow-by gases accumulate. A valve cover 7 is positioned on top of the engine and there are conventional communication passages between the upper portion of the engine within cover 7 and the crankcase 2 for the circulation of air and gases. The engine 1 is provided with an air intake system comprising an intake manifold 3, a carburetor 4 and an air filter 6. The blow-by gas system for the engine includes a fresh air intake conduit or hose 8 extending from the air cleaner 6 to an inlet port in the valve cover 7 for supplying fresh air to the upper part of the engine. Further, the blow-by gas system includes a crankcase breather casing 9 in direct communication with the crankcase 2 and having baffles to minimize the moisture extracted from the crankcase and a PCV valve 10 connected to the breather casing 9 with a conduit or hose 5 extending from the PCV valve 10 to the intake manifold 3. As thus far described, the blow-by gas system is one form of conventional system in which blow-by gas is withdrawn from the crankcase together with some fresh air supplied through the top of the engine and the gaseous combination is introduced into the engine intake system downstream of the carburetor to mix with the fuel-ladened air, all to be combusted throughout the normal operation of the engine. Such a system has some of the inherent problems described above.

According to the present invention, coolant conducting means are provided for using the engine coolant system for heating one or more portions of the blow-by gas system and such means may include, as shown in FIGS. 1 through 4, an arrangement for heating the PCV valve 10. A water jacket 11 surrounds the PCV valve 10 and an inlet hose 14 and an outlet hose 15 are connected to the jacket 11 for continually passing the engine coolant through the jacket 11. The inlet hose 14 is connected to a coolant bypass outlet 12 which preferably is in direct communication with the conventional thermostat control (not shown) provided in association with the coolant pump (not shown) that causes the coolant to be recirculated within the engine during warm-up periods before being circulated to the radiator for cooling purposes and subsequently becomes a portion of the normal coolant circulating system when the engine reaches normal operating temperature. The outlet hose 15 from the jacket 11 is connected to a connector pipe 13 to return the coolant to the engine and the normal cooling system. Thus, in the embodiment of FIGS. 1 through 4, the PCV valve 10 is continually heated to defreeze or prevent freezing thereof and to assist in the vaporization of moisture passing therethrough from the breather 9. The heating of PCV valve starts immediately upon starting the engine due to the recirculation of the coolant and yet the degree of heating is never excessive since it is controlled by the normal coolant temperature control system for the engine.

Figure 2:
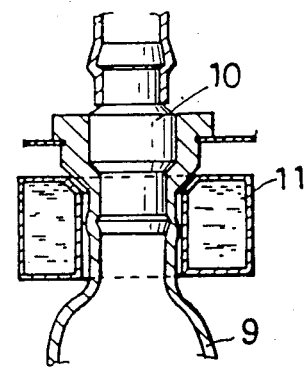
FIG. 2 is an enlarged sectional elevation of the PCV valve portion of the embodiment illustrated in FIG. 1.
Figure 3:
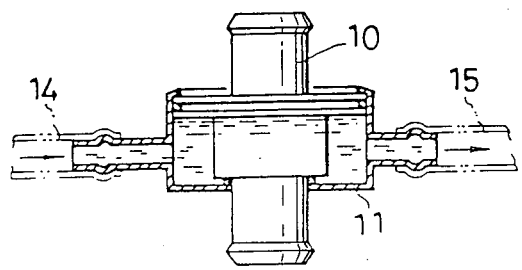
FIG. 3 is a sectional elevation of a second embodiment of the PCV valve portion of this invention.
Figure 4:
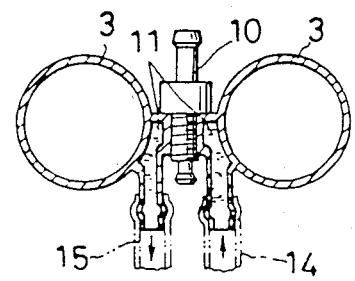
FIG. 4 is a sectional view of a third embodiment of the PCV valve portion of the blow-by gas system of this invention.

In the embodiment of FIG. 2, as noted above, the PCV valve is actually inserted in an upper portion of the breather casing 9 with the annular coolant jacket 11 merely surrounding the connection between the breather casing 9 and PCV valve 10. However, in FIG. 3 the coolant jacket 11 is a separate unit adapted to surround only the PCV valve 10 which valve can then be inserted at any desired location along the bypass hose 5 rather than being directly connected to the breather casing 9. In the embodiment of FIG. 4 the intake manifold 3 is of a special construction comprising two parallel tubular portions with the PCV valve 10 mounted therebetween and the coolant jacket 11 formed integrally with the intake manifold 3 to supply coolant around the PCV valve.

Figure 5:
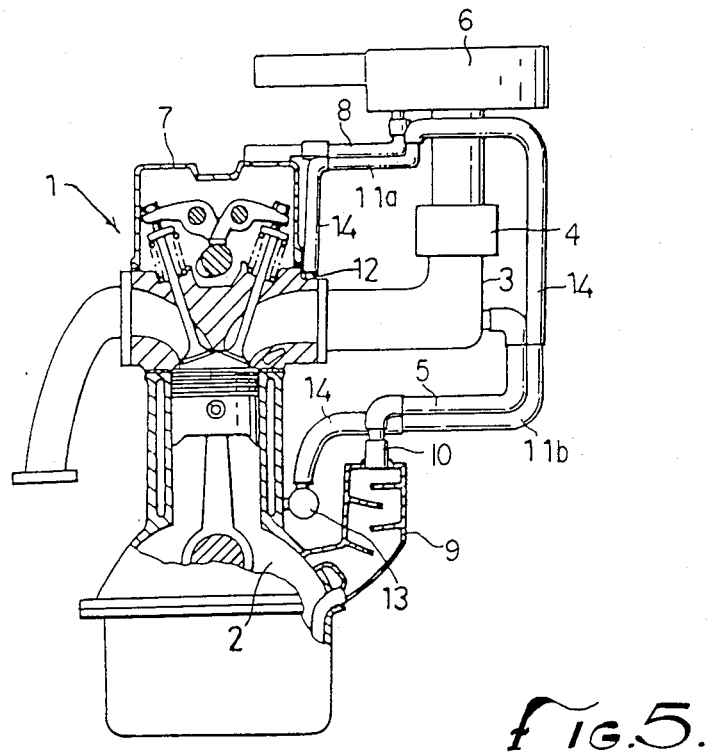
FIG. 5 is an end elevation with portions shown in section of an engine with another embodiment of the blow-by gas system of this invention.
Figure 8:
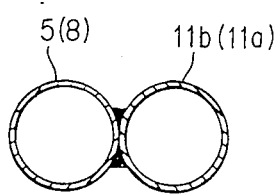
FIG. 8 is a sectional elevation of the heat exchange portion of the bypass gas systems of FIGS. 5 and 6.

Referring now to FIG. 5, as noted above the conventional engine components remain the same and only the blow-by gas heating system is different. The coolant hose 14 extends from coolant bypass outlet 12 to the connector pipe 13 and includes heat exchange portions 11a and 11b which are preferably of metal. The fresh air inlet hose 8 from air cleaner 6 to valve cover 7 includes a heat exchange portion, also preferably of metal, joined to coolant hose portion 11a and blow-by gas hose 5a includes a preferably metal portion joined to the coolant hose portion 11b in heat exchange relation, as also shown in FIG. 8. By this arrangement, the engine-heated coolant flows through hose 14 and portion 11a to heat the incoming fresh air in hose 18 and then through hose portion 11b to heat the blow-by gases in hose 5 that are being introduced into the intake manifold 3. This provides the desired heating to avoid freezing and enhance vaporization in both the fresh air inlet and the blow-by gas conduits with the degree of heating controlled by the engine coolant system without further controls or electrical apparatus.

Figure 6:
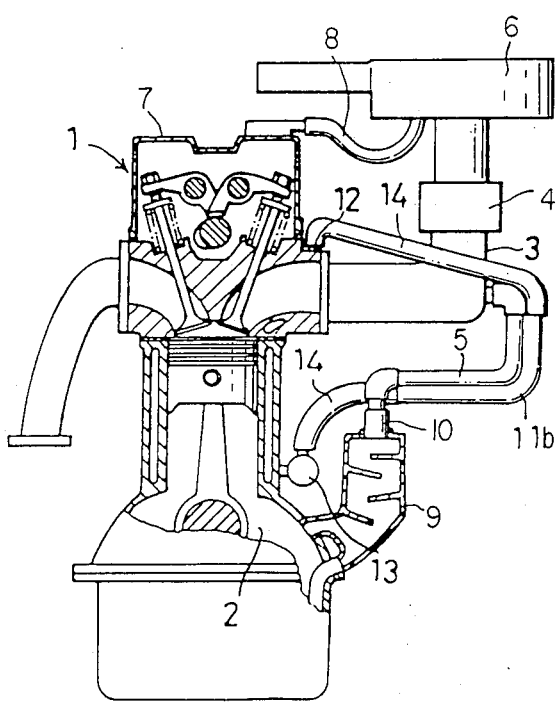
FIG. 6 is an end elevation with portions in section of an engine with still another embodiment of the blow-by gas system of this invention.
Figure 9:
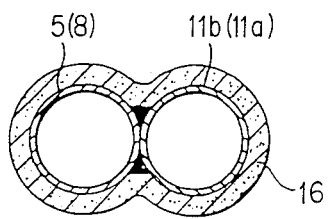
FIG. 9 is a sectional view similar to FIG. 8 illustrating a modified embodiment with insulation.

FIG. 6 illustrates another embodiment of the system of this invention similar to FIG. 5 but wherein only the blow-by gas conduit is heated. Specifically, the coolant hose 14 is connected from the coolant bypass outlet 12 through a preferably metal portion 11b and then to the connector pipe 13 to the engine for coolant circulation. The blow-by gas hose 5 from the PCV valve 10 to the air intake manifold 3 is connected to coolant hose portion 11b in heat exchange relationship, as shown in FIG. 8. Further, as shown in FIG. 9, the heat exchange portions of the system comprising parallel and joined tubes may be insulated by an appropriate material 16 to enhance the heat exchange and reduce the ambient cooling effect on the blow-by gas hose 5 and intake air hose 8.

Figure 7:
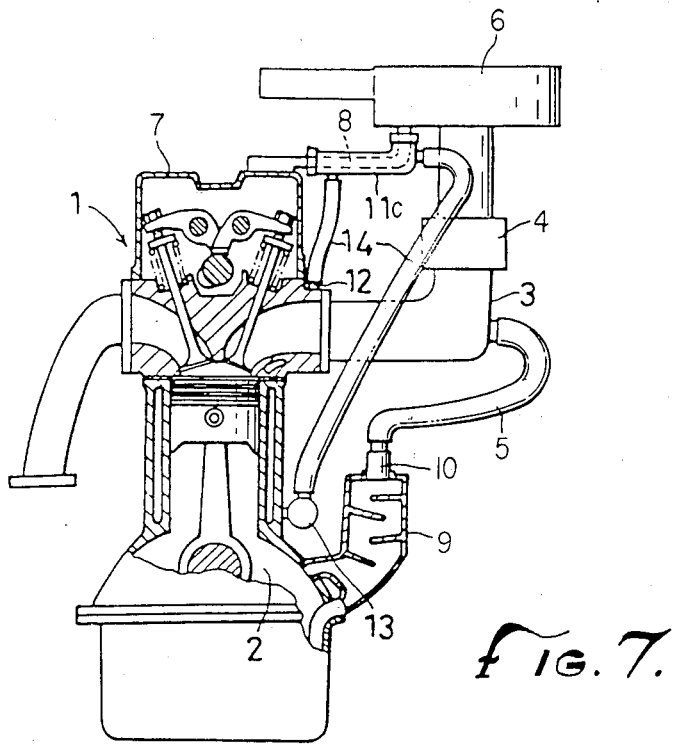
FIG. 7 is an end elevation with portions in section of an engine with a still further embodiment of the blow-by gas system of this invention.
Figure 10:
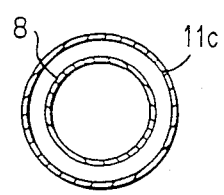
FIG. 10 is a sectional end view of the heat exchange portion of the embodiment of FIG. 7.
Figure 11:
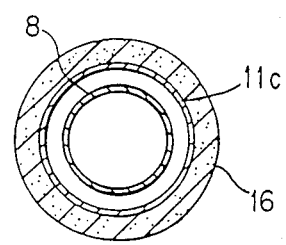
FIG. 11 is a sectional end view similar to FIG. 5 illustrating an insulated modification thereof.

Referring to FIG. 7, another embodiment of this invention is illustrated wherein the coolant hose 14 includes a heat exchange portion 11c between the connection of hose 14 from coolant bypass outlet 12 to connector pipe 13. As illustrated in FIG. 10, the fresh air inlet hose 8 has a preferably metallic portion positioned concentrically within the heat exchange portion 11c of hose 14 with the coolant being circulated in the annular space between the two hoses for heating the air within hose 8. An insulation 16 may be provided on the outside of hose portion 11c for inhibiting the loss of heat, as shown in FIG. 11.

Thus, according to this invention, a system is provided for heating the components of a conventional blow-by gas system of an internal combustion engine by using the engine coolant whereby the use of expensive and unreliable controls and power consuming electrical heaters are avoided.

The invention claimed:

1. A blow-by gas heating system for a water-cooled internal combustion engine having an engine block, an intake manifold, a crankcase, and an overhead valve cover, and an air inlet port on the valve cover and a crankcase blow-by gas outlet port on the crankcase, with those ports at spaced locations, comprising, conduit means separate from the engine block connecting the blow-by gas outlet port to the intake manifold and including valve means for controlling the blow-by gas flow therethrough, conduit means separate from the engine block connecting the air inlet port to a source of fresh air, coolant conducting means separate from the engine block connected to the engine water-cooling system for circulating engine heated coolant through said coolant conducting means, said coolant conducting means positioned in heat exchange relationship with at least a portion of one of said conduit means for heating said portion of said conduit means and the gas flowing therethrough, and said coolant conducting means including a coolant jacket portion in heat exchange relationship with said valve means for heating the valve and blow-by gas flowing therethrough.

2. The system of claim 1 wherein said coolant jacket is of an annular shape and surrounds said valve means.

3. The system of claim 1 wherein said coolant jacket is integrally formed with the engine intake manifold and said valve means is mounted on said engine intake manifold.

4. A blow-by gas heating system for a water-cooled internal combustion engine having an engine block, an intake manifold, a crankcase, and an overhead valve cover, and an air inlet port on the valve cover and a crankcase blow-by gas outlet port on the crankcase, with those ports at spaced locations, comprising, conduit means separate from the engine block connecting the blow-by gas outlet port to the intake manifold and including valve means for controlling the blow-by gas flow therethrough, conduit means separate from the engine block connecting the air inlet port to a source of fresh air, coolant conducting means separate from the engine block connected to the engine water-cooling system for circulating engine heated coolant through said coolant conducting means, and said coolant conducting means being positioned in heat exchange relationship with a portion of only said conduit means connecting the blow-by gas outlet to the intake manifold for heating the blow-by gas flowing therethrough.

5. A blow-by gas heating system for a water-cooled internal combustion engine having an engine block, an intake manifold, a crankcase, and an overhead valve cover, and an air inlet port on the valve cover and a crankcase blow-by gas outlet port on the crankcase, with those ports at spaced locations, comprising, conduit means separate from the engine block connecting the blow-by gas outlet port to the intake manifold and including valve means for controlling the blow-by gas flow therethrough, conduit means separate from the engine block connecting the air inlet port to a source of fresh air, coolant conducting means separate from the engine block connected to the engine water-cooling system for circulating engine heated coolant through said coolant conducting means, and said coolant conducting means positioned in heat exchange relationship with a portion of only said conduit means connected to the air inlet port for heating the fresh air flowing therethrough.

6. A blow-by gas heating system for a water-cooled internal combustion engine having an engine block, an intake manifold, a crankcase, and an overhead valve cover, and an air inlet port of the valve cover and a crankcase blow-by gas outlet port on the crankcase, with those ports at spaced locations, comprising, conduit means separate from the engine block connecting the blow-by gas outlet port to the intake manifold and including valve means for controlling the blow-by gas flow therethrough, conduit means separate from the engine block connecting the air inlet port to a source of fresh air, coolant conducting means separate from the engine block connected to the engine water-cooling system for circulating engine heated coolant through said coolant conducting means, and said cooling conducting means positioned in heat exchange relationship with at least a portion of both said conduit means for separately heating both the blow-by gas and the fresh air.

* * * * *